United States Patent
Suzuki et al.

(10) Patent No.: US 6,892,254 B2
(45) Date of Patent: May 10, 2005

(54) DEVICE DRIVER APPARATUS FOR I/O DEVICE SIMULATION

(75) Inventors: Masakazu Suzuki, Kawasaki (JP); Hirobumi Yamaguchi, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 203 days.

(21) Appl. No.: 09/998,516

(22) Filed: Dec. 3, 2001

(65) Prior Publication Data

US 2003/0023791 A1 Jan. 30, 2003

(30) Foreign Application Priority Data

Jul. 27, 2001 (JP) .......................... 2001-227800

(51) Int. Cl.[7] .............................................. G06F 13/12
(52) U.S. Cl. .............................. 710/62; 710/8; 710/15; 710/58; 710/72
(58) Field of Search ........................... 710/8, 15, 58, 710/62, 72

(56) References Cited

U.S. PATENT DOCUMENTS

| | | | | |
|---|---|---|---|---|
| 5,033,049 A | * | 7/1991 | Keener et al. | 371/23 |
| 5,357,519 A | * | 10/1994 | Martin et al. | 371/15 |
| 5,440,697 A | * | 8/1995 | Boegel et al. | 395/500 |
| 5,442,305 A | * | 8/1995 | Martin et al. | 326/30 |
| 6,496,900 B1 | * | 12/2002 | McDonald et al. | 711/112 |

* cited by examiner

Primary Examiner—Jeffrey Gaffin
Assistant Examiner—Alan Chen
(74) Attorney, Agent, or Firm—Staas & Halsey LLP

(57) ABSTRACT

A device driver apparatus, which can be configured at low cost, implements various types of tests while making a process perform the same operations as those of an actual I/O device in use.

The device driver apparatus is configured by comprising an adapter which transmits or receives signal or data between an initiator and a pseudo process simulating an I/O device connected via a bus using a predetermined protocol, and a driver which is arranged between the adapter and the pseudo process simulating the I/O device, notifies the pseudo process of one or more of command and data from the adapter, and also notifies the adapter of one or more of status and data from the pseudo process.

With this low-cost configuration, various types of tests can be conducted while making a process perform the same operations as those of an actual I/O device in use.

8 Claims, 15 Drawing Sheets

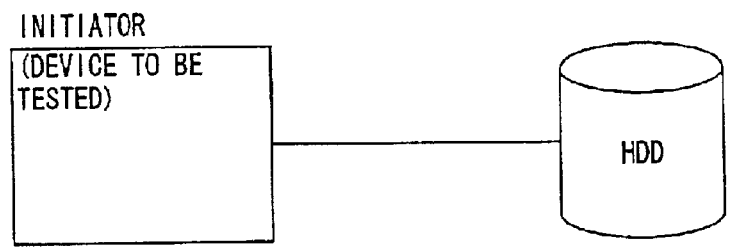
F I G. 1A
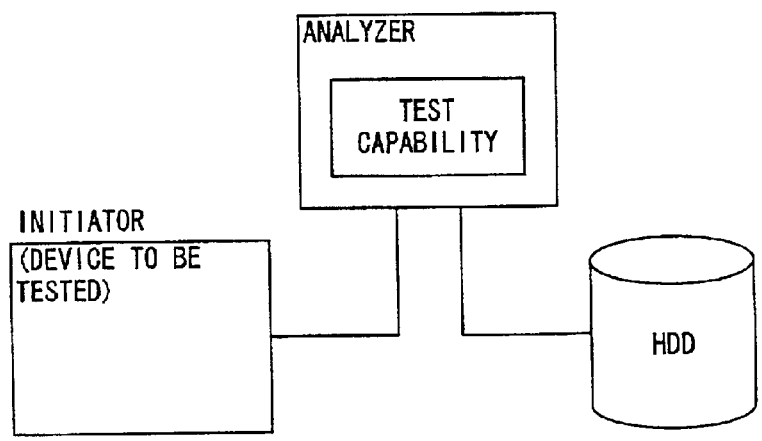
F I G. 1B
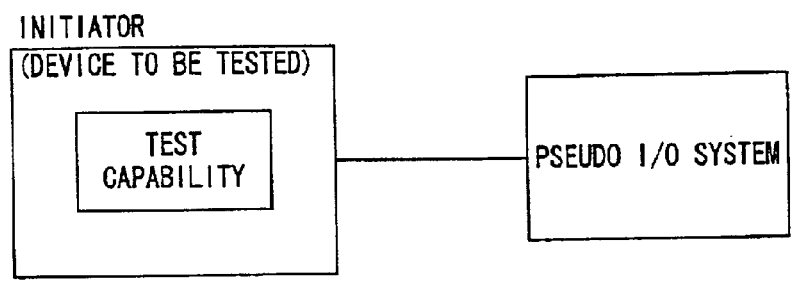
F I G. 1C

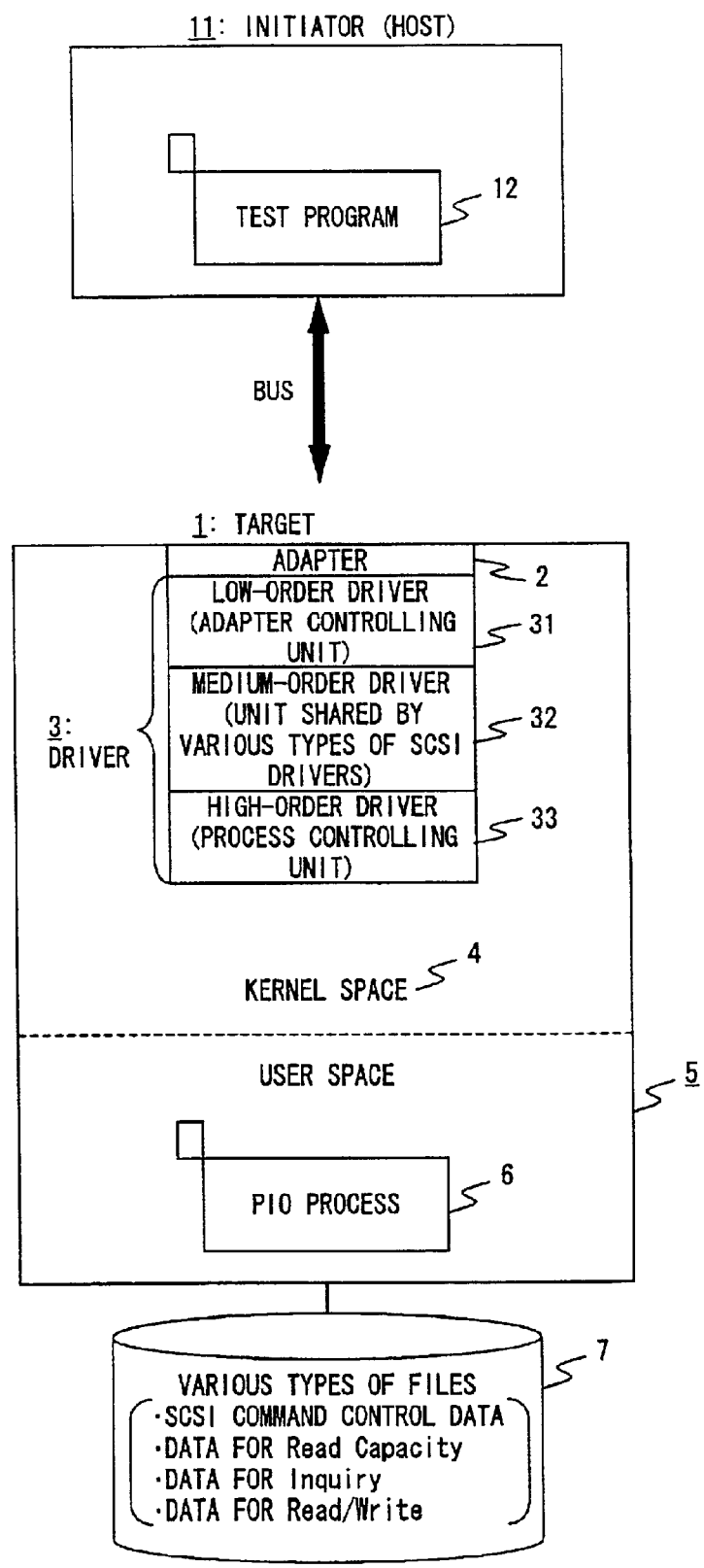
F I G. 2

(a) EXAMPLE OF ENCAPSULATION USING FC PROTOCOL
FRAME (Frame Format)

EXAMPLE OF Read SYSTEM COMMAND

| SOF | Frame Header | Data Payload | CRC | EOF |
|---|---|---|---|---|
| | CORRESPONDING TO SCSI ID | | | |

Data Payload:
| Read | ADDRESS | LENGTH |
|---|---|---|

F I G. 1 0 A (b) EXAMPLE OF ENCAPSULATION USING iSCSI PROTOCOL
DATA FORMAT

EXAMPLE OF Read SYSTEM COMMAND

| Ethernet Header (Datalink Layer) | IP Header (Network Layer) | TCP Header (Transport Layer) | DATA (Session Layer) |
|---|---|---|---|
| | CORRESPONDING TO SCSI ID | | |

DATA (Session Layer):
| Read | ADDRESS | LENGTH |
|---|---|---|

| PROCESS SETTING FILE | | | |
|---|---|---|---|
| COMMAND | VALID/INVALID | ACTION | ERROR FILE |
| TEST UNIT READY | VALID | Control SYSTEM | error_file 1 |
| | | | |

FIG. 13B

| ERROR SETTING FILE (error_file 1) | |
|---|---|
| TIMING | ERROR CONTENTS |
| WHEN REPLY DATA IS RETURNED | REPLY DATA CHANGE (EX: GOOD(0x00)→BUSY(0x08)) |

FIG. 13C

| INITIATOR SCSI COMMAND | |
|---|---|
| COMMAND | CONTENTS |
| TEST UNIT READY | 00 00 00 00 00 00 |

FIG. 13D

| STATUS | |
|---|---|
| STATUS | VALUE |
| GOOD | 0 |
| BUSY | 8 |

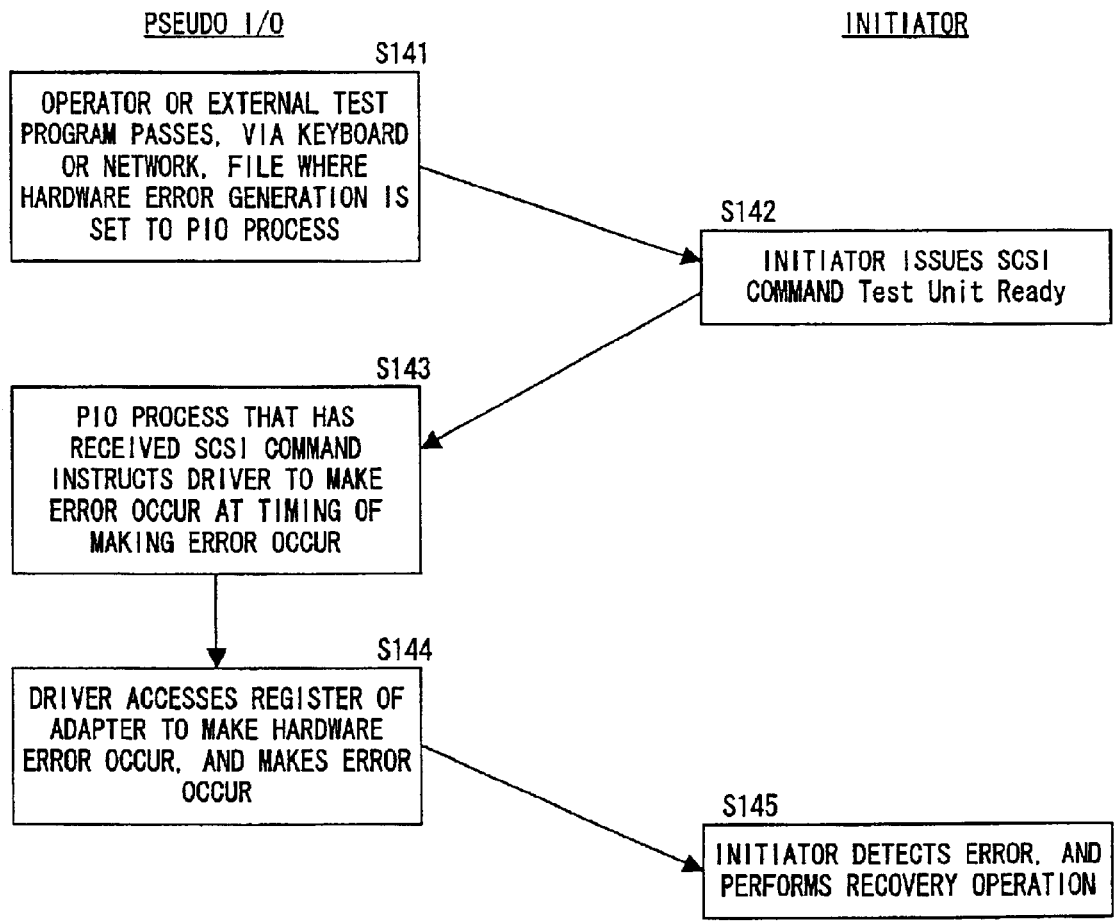
F I G. 1 4

FIG. 15A

| PROCESS SETTING FILE ||||
| COMMAND | VALID/INVALID | ACTION | ERROR FILE |
| TEST UNIT READY | VALID | Control SYSTEM | error_file 10 |
|  |  |  |  |

FIG. 15B

| ERROR SETTING FILE (error_file 10) ||
| TIMING | ERROR CONTENTS |
| WHEN REPLY DATA IS RETURNED | FAULT IS MADE TO OCCUR IN SIGNAL TRANSMITTED OVER CABLE (EX: GENERATING Link Failure) |

FIG. 15C

| INITIATOR SCSI COMMAND ||
| COMMAND | CONTENTS |
| TEST UNIT READY | 00 00 00 00 00 00 |

FIG. 15D

| STATUS ||
| STATUS | VALUE |
| GOOD | 0 |
| BUSY | 8 |

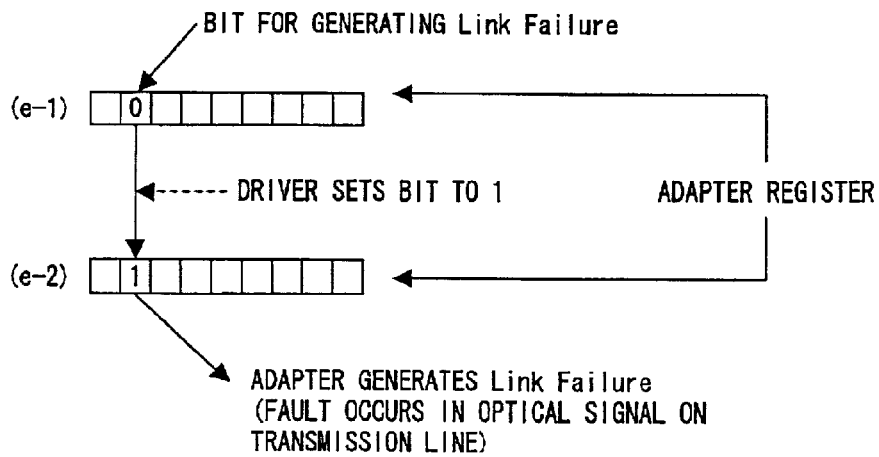

FIG. 15E

DEVICE DRIVER APPARATUS FOR I/O DEVICE SIMULATION

BACKGROUND OF THE INVENTION

1. Field of the Invention

The present invention relates to a device driver apparatus, which is connected to an initiator via a bus, transmitting/receiving a signal between the initiator and a process simulating an I/O device.

2. Description of the Related Art

Conventionally, there is a system comprising an I/O device connected to a SCSI or FC interface. Among others, for example, there is a system conducting various types of tests on an initiator. Its test method falls into 3 types.

FIG. 1 shows the conventional three test methods.

The conventional three test methods include (1) a method conducting various types of tests by connecting to an initiator of an actual I/O device such as a hard disk drive, etc. (see FIG. 1A); (2) a method conducting various types of tests by connecting an analyzer having a test capability between an initiator and an actual I/O device (see FIG. 1B); and (3) a method conducting various types of tests by connecting to an initiator of a pseudo I/O system recited in Japanese Patent Publication No. 6-52072 or 5-73446 (see FIG. 1C).

If various types of tests are conducted on an initiator by connecting an actual I/O device to the initiator shown in FIG. 1A with the above described method (1), all of devices to be connected such as a hard disk drive, a tape drive, etc., for which the tests are to be conducted, must be prepared. Additionally, if attempts are made to conduct a test on devices whose type is the same, for example, hard disk drivers whose type is the same, but whose sector sizes are different, corresponding hard disk drives having different sector sizes must be prepared. Furthermore, it is extremely difficult to conduct a test on an initiator by making an abnormal operation such as no response, timeout, etc. of an actual I/O occur, even if attempts are made to conduct such a test. This is because the actual I/O does not perform an abnormal operation, when it has no problem.

When various types of tests are conducted on an initiator by connecting an analyzer between the initiator shown in FIG. 1B and an actual I/O device with the above described method (2), it is troublesome that corresponding actual I/O devices must be prepared if the type of an actual I/O device is changed, or if the sector size of an actual I/O device is changed although the type of the device is the same.

Although various types of tests are conducted by connecting to an initiator of a pseudo I/O system, which is shown in FIG. 1C and recited in each of Japanese Patent Publications, with the above described method (3), Japanese Patent Publications target only a test on an interface such as a SCSI interface, etc. Besides, data that are handled by the pseudo I/O system and a connected test system are those generated for a test, which are different from data for actual use. Therefore, a test for actual use cannot be conducted, and at the same time, there are no adapters or drivers for allowing such various types of tests to be conducted by application software having high versatility.

SUMMARY OF THE INVENTION

An object of the present invention is to provide a device driver apparatus that can be configured at low cost, and implements various types of tests while making a process perform the same operations as those of an actual I/O device by arranging an adapter that is connected to an initiator via a bus, and a driver that passes a command, data, etc. between the adapter and the process.

In the configuration of a system according to the present invention, which is intended to attain the above described object (see FIG. 2), a target 1 is a device that is connected to a bus and simulates each type of an actual I/O device, and configured by an adapter 2, a driver 3, a PIO (Pseudo IO) process 6, etc. The adapter 2, which is connected to the initiator 11 via a bus, transmits/receives a signal and data with a predetermined protocol. The driver 3 passes a command and data between the adapter 2 and the PIO process 6, and is composed of a low-order driver 31, a medium-order driver 32, and a high-order driver 33.

The PIO process 6 is a process implemented by application software that simulates an I/O device. The initiator 11 is a device to be tested, which is connected by the bus. Here, a test of determining whether or not the initiator 11 performs a process corresponding to an error occurrence for an I/O device (the target 1 in this case) is conducted.

Next, the operations of this system are described.

Here, the adapter 2 of the target 1 is connected to the bus, and exchanges a signal and data with the initiator 11 with a predetermined protocol. The driver 3 notifies the PIO process 6 of one or more of a command and data from the adapter 2, and also notifies the adapter 2 of one or more of a status and data from the PIO process 6. At this time, a SCSI protocol or a protocol into which the SCSI protocol is encapsulated is used as the predetermined protocol, with which a signal and data are exchanged.

Additionally, the adapter 2 notifies the driver 3 that a command has been received from the initiator 11. The driver 3 notifies the PIO process 6 of the notified command. The PIO process 6 returns a status being a reply to the driver 3. The driver 3 notifies the adapter 2 of the status. The adapter 2 then returns the status to the initiator 11.

Furthermore, the adapter 2 notifies the driver 3 that a command has been received from the initiator 11. The driver 3 notifies the PIO process 6 of the notified command. The PIO process 6 returns a buffer address to the driver 3 after preparing data and storing the data in a buffer. The driver 3 sets the buffer address in a register of the adapter 2. The adapter 2 then extracts the data from the buffer address set in the register, and transmits the extracted data to the initiator 11.

Still further, the adapter 2 notifies the driver 3 that a command has been received from the initiator 11. The driver 3 notifies the PIO process 6 of the notified command. The PIO process 6 prepares a buffer, and returns a buffer address to the driver 3. The driver 3 sets the buffer address in a register of the adapter 2. The adapter 2 stores data that is requested of the initiator 11 at the buffer address set in the register, and notifies the driver 3 of the data. The driver 3 notifies the PIO process 6 that the data has been received. The PIO process 6 extracts the data from the address of the buffer, and returns a status being a reply to the driver 3. The driver 3 sets the status in a register of the adapter 2. The adapter 2 then returns the status to the initiator 11.

The driver 3 is configured by a low-order driver 31 for the adapter 2, a high-order driver 33 for the PIO process 6, and a medium-order driver 32 that passes a signal between the low-order driver 31 and the high-order driver 33. The PIO process 6 notifies the adapter 2 or the driver 3 of an error. The adapter 2 or the driver 3 makes the notified error occur.

Additionally, the PIO process 6 simulates an actual I/O device by transmitting or receiving the status or data of a specified I/O device. Furthermore, the PIO process 6 simulates an error test on an actual I/O device by making a specified error occur when the status or data of the specified I/O device is transmitted or received.

As described above, the adapter 2 connected to the bus, and the driver 3 for passing a command, data, etc. between the adapter 2 and the PIO process 6 are arranged, thereby providing a system that can be configured at low cost, and implement various types of tests while making a process perform the same operations as those of an actual I/O device in use.

BRIEF DESCRIPTION OF THE DRAWINGS

FIGS. 1A, 1B, and 1C respectively explain conventional techniques;

FIG. 2 shows the configuration of a system according to the present invention;

FIGS. 10A and 10B explain encapsulation according to the present invention;

FIGS. 13A to 13D exemplify setting files relating to the operations shown in FIG. 12, according to the present invention;

FIG. 14 is a flowchart explaining the operations for making an error occur by invoking a hardware error generation capability comprised by an adapter, according to the present invention; and FIGS. 15A through 15E exemplify setting files relating to the operations shown in FIG. 14, according to the present invention.

DESCRIPTION OF THE PREFERRED EMBODIMENTS

Figure 3:
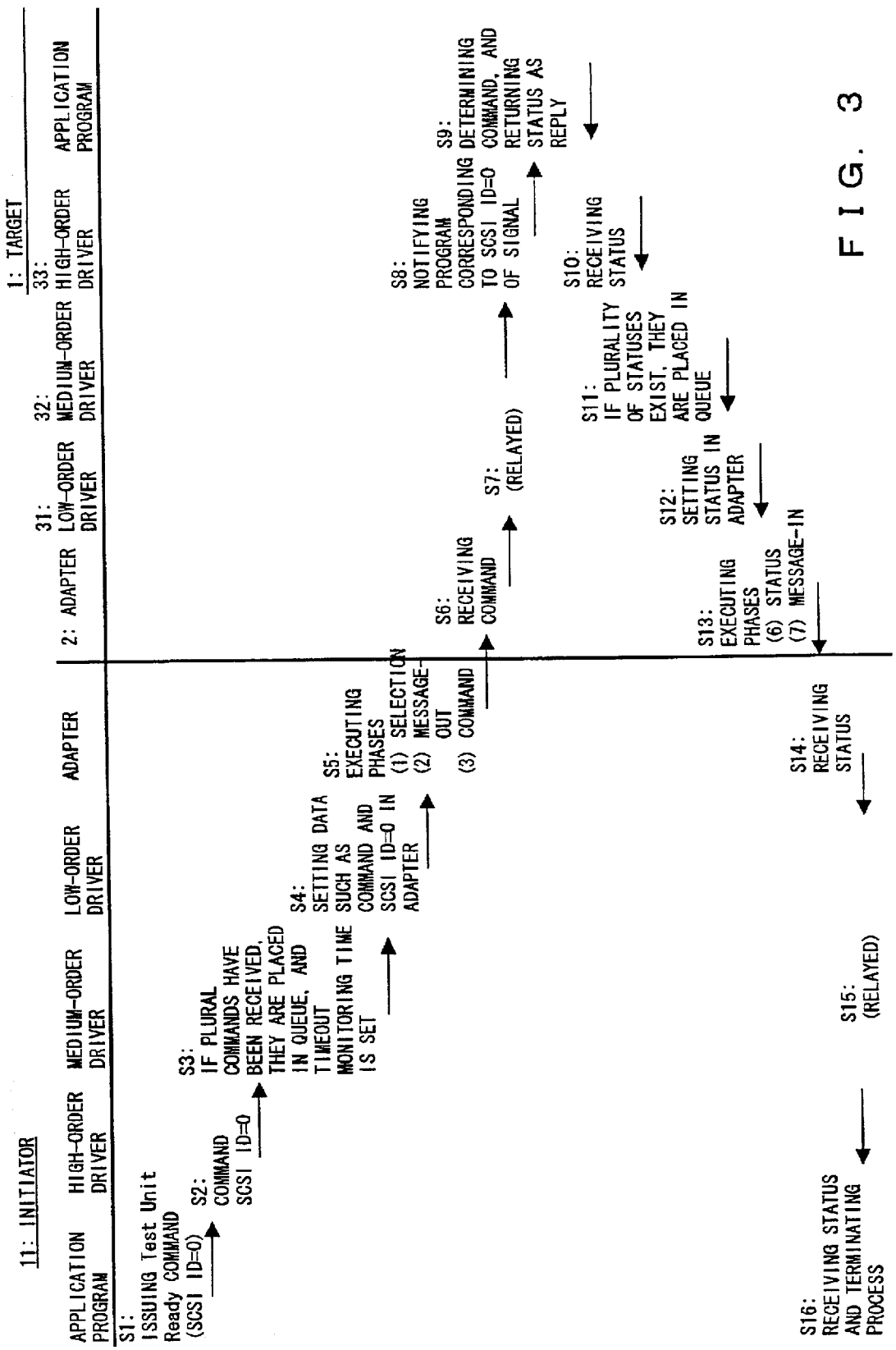
FIG. 3 explains a preferred embodiment (No. 1) according to the present invention.

Next, preferred embodiments according to the present invention and their operations are described in detail with reference to FIGS. 2 through 15.

In the above described FIG. 2, the target 1 is a device that is connected to a bus using a SCSI protocol, etc., and simulates each type of an actual I/O device. Here, the target 1 is configured by the adapter 2, the driver 3, a kernel space 4, a user space 5, etc.

The adapter 2 is connected to the bus using the SCSI protocol, etc., and transmits/receives a signal and data.

The driver 3 transmits/receives a command and data between the adapter 2 and the PIO process 6 (more precisely, under the control of a kernel), and is configured by the low-order driver 31, the medium-order driver 32, and the high-order driver 33.

The low-order driver 31 is a driver for the adapter 2, and transmits/receives a signal and data to/from the adapter 2.

The medium-order driver 32 exchanges a signal and data between the low-order driver 31 and the high-order driver 33, and operates as a unit shared by various types of drivers for SCSI.

The high-order driver 33 is a driver for the PIO process 6, and operates as a process controlling unit.

The kernel space 4 is a space where a kernel (operating system), etc. is made to run. Here, this is a space where the kernel which controls signal or data exchange between the driver 3 and the PIO process 6 running in the user space 5.

The user space 5 is a space where an application program such as the PIO process 6, etc. is made to run under the control of the kernel (operating system) running in the kernel space 4.

The PIO process 6 is a process (pseudo I/O process) implemented by an application program that simulates each type of an actual I/O device, and makes a normal operation or an error occur by receiving, via the driver, a preset command or data, which are set in various types of files 7 and intended to make the process perform the same operations as those of each type of an actual I/O device (such as a hard disk drive, a tape drive, etc.) in use. Note that error generation will be described later with reference to FIGS. 12 to 15.

The initiator (host) 11 is a computer system which each type of an I/O device is connected to, and performs a transaction process by making a data access. Here, the initiator (host) 11 is a device, to which the target (pseudo I/O device) 1 is connected via the bus, and for which whether or not a fault avoiding process is properly performed at the time of an error occurrence is to be verified or tested. The initiator 11 includes a test program 12, etc.

The test program 12 instructs an error occurrence, and verifies (tests) whether or not the initiator 11 performs a process suitable for an error (such as a retry process at the time of a read error occurrence) in the state where the target 1 connected via the bus is made to perform operations similar to those in normal use.

Next, the operations of the adapter 2, the low-order driver 31, the medium-order driver 32, the high-order driver 33, and the application program (the PIO process 6), which are performed when the initiator 11 issues a Test Unit Ready (SCSI ID=0) command corresponding to an I/O device having SCSI ID=0, are described in detail with reference to FIGS. 3 and 4.

FIG. 3 explains a preferred embodiment (No. 1) according to the present invention. Here, the initiator 11 at the top on the left side is the initiator 11 shown in FIG. 2, and is configured by an application program (a test program 12), a high-order driver, a medium-order driver, a low-order driver, and an adapter. The target 1 at the top on the right side is the target 1 shown in FIG. 2, and is configured by the adapter 3, the low-order driver 31, the medium-order driver 32, the high-order driver 33, and the application program (PIO process 6). An initiator and a target shown in the subsequent drawings are similar to the above described initiator and target. Note that S1, S2, . . . , in FIG. 3 represent a process order.

In FIG. 3, the test program 12 of the initiator 11 issues the Test Unit Ready command (SCSI ID=0) in S1.

In S2, the high-order driver of the initiator 11 notifies the medium-order driver of the command and SCSI ID=0.

In S3, if pluralities of commands exist, the medium-order driver of the initiator 11 places them in a queue, sets a timeout monitoring time to each of them and notifies the high-order driver of the commands and SCSI ID=0.

In S4, the high-order driver of the initiator 11 sets the data (the command and SCSI ID=0) in the adapter.

In S5, the adapter of the initiator 11 executes respective phases (a selection phase (1); a message-out phase (2); and a command phase (3)). As a result, the phases such as the selection phase (1), the message-out phase (2), and the command phase (3), which are shown in FIG. 4 and will be described later, are sequentially executed, so that the command is transmitted to the adapter 2 of the target 1 via the SCSI bus shown in FIG. 2.

In S6, the adapter 2 of the target 1 receives the command (Test Unit Ready (SCSI ID=0) as a result of the above described phases ((1), (2), and (3)) executed in S5, and notifies the low-order driver 31 of the received command.

In S7, the low-order driver 31 notifies the medium-order drive 32 of the received command, and the medium-order driver 32 notifies the high-order driver 33 of the received command.

In S8, the high-order driver 33 notifies the program corresponding to the notified SCSI ID=0 (the PIO process 6 having SCSI ID=0 shown in FIG. 2) of a signal.

In S9, the application program that is notified of the signal in S8 determines the command, and returns a status signal. Since the Test Unit Ready command is notified here, a reply signal is returned as the status signal.

In S10, the high-order driver 33 receives the status signal.

In S11, the medium-order driver 32 notifies the low-order driver 31 of the status signal notified from the high-order driver 33. If a plurality of status signals exist at this time, they are placed in a queue, and sequentially passed to the low-order driver 31.

In S12, the low-order driver 31 sets the status signal in the adapter 2.

In S13, the adapter 2 executes respective phases (a status phase (6) and a message-in phase (7)). As a result, the phases such as the status phase (6) and the message-in phase (7), which are shown in FIG. 4 and will be described later, are sequentially executed, so that the status signal is transmitted to the adapter 2 of the initiator 11 via the SCSI bus shown in FIG. 2.

In S14, the adapter of the initiator 11 receives the status signal as a result of the phases ((6) and (7)) executed in S13.

In S15, a notification of the status signal from the adapter is sequentially relayed by the low-order driver, the medium-order driver, and the high-order driver, and finally notified to the application program (test program 12).

In S16, the application program receives the status. Here, the process is completed.

As described above, if the application program (such as the test program 12) of the initiator 11 issues the Test Unit Ready command (SCSI ID=0), this command is notified to the application program (such as the PIO process 6), which corresponds to an I/O device specified with SCSI ID=0, via the bus, the adapter 2 of the target 1, the low-order driver 31, the medium-order driver 32, and the high-order driver 33. Then, a status signal, which is a reply, is returned from this application program, and received by the application program of the initiator 11 on a route reverse to the above described one. In this way, a series of tests can be conducted.

Namely, the adapter 2, the low-order driver 31, the medium-order driver 32, and the high-order driver 33 are arranged in the target 1 to make the target 1 identical to an actual I/O device, a command is notified from the initiator 11 to the application program (such as the PIO process 6), which simulates an I/O device specified, for example, with SCSI ID=0, and the same reply (status signal) as that of the actual I/O device in use, or an error depending on need is returned from the application program simulating the I/O device, so that the process for a normal operation or an error of the initiator 11 is monitored. As a result, a test on the initiator 11 can be easily conducted.

Figure 4:
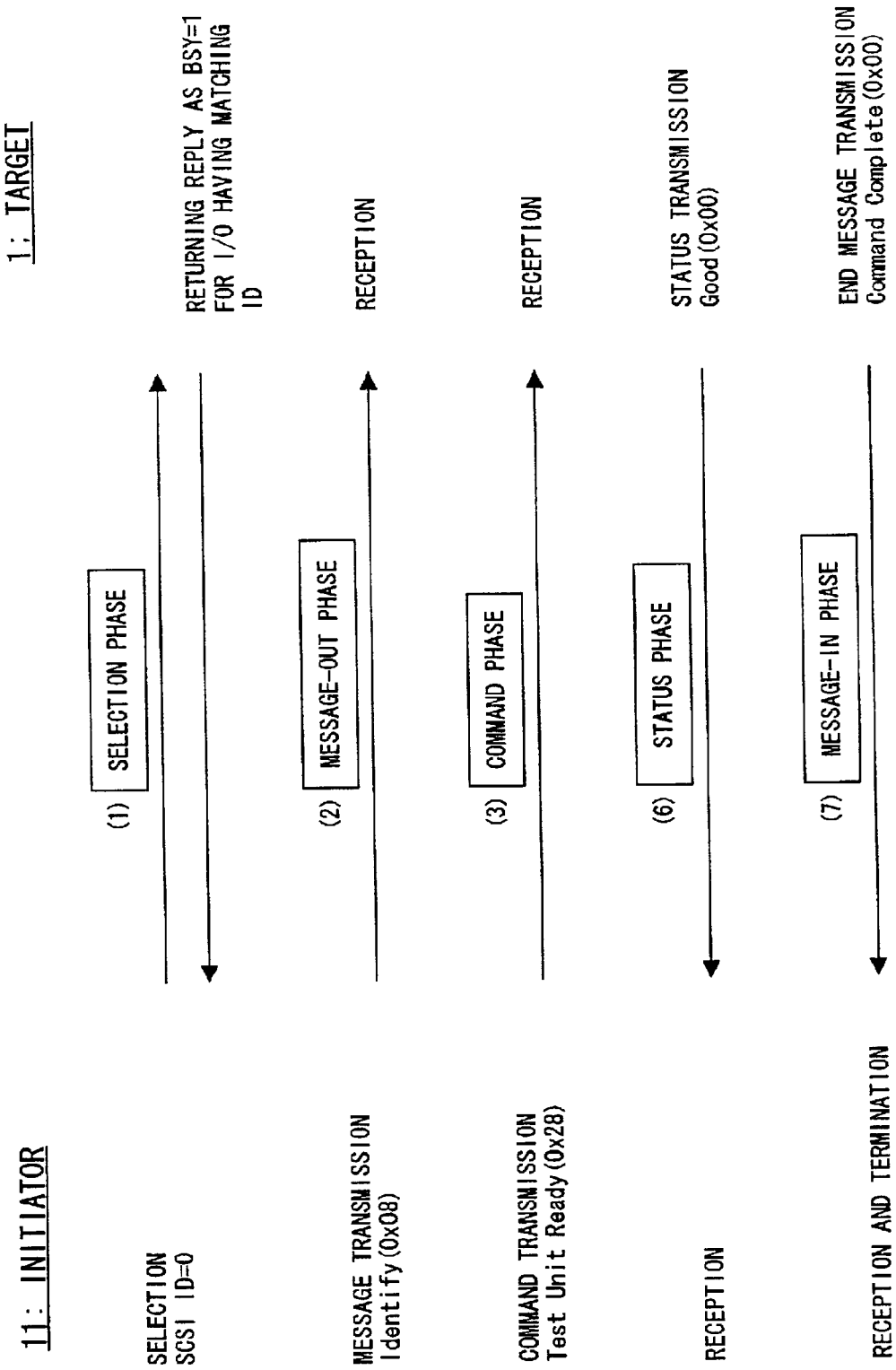
FIG. 4 exemplifies a control system command in the operations shown in FIG. 3 according to the preferred embodiment (No. 1)

FIG. 4 exemplifies a control system command in the operations shown in FIG. 3. The control system command shown in FIG. 4 is transmitted as a result of the above described phases (1), (2), and (3) sequentially-executed in S5 of FIG. 3. Then, a status signal is transmitted as a result of the phases (6) and (7) executed in S13. Here, the initiator 11 on the left side is the initiator 11 on the left side of FIG. 3, and the initiator 11 shown in FIG. 2 at the same time. The target 1 on the right side is the target 1 on the right side of FIG. 3, and the target 1 shown in FIG. 2 at the same time. The initiator 11 and the target 1 in the subsequent drawings are similar.

In FIG. 4, the selection phase (1) is a phase in which an I/O device (the target 1) that is connected to the bus and has a matching ID (for example, SCSI ID=0 here) returns a reply indicating the status BUSY=1, when the initiator 11 transmits a selection (for example, SCSI ID=0) to the bus, so that the I/O device (target 1) is selected.

The message-out phase (2) is a phase in which a message (Identify (0x08) is transmitted to the bus, and the partner side (the target 1) receives the message.

The command phase (3) is a phase in which the command (Test Unit Ready (0x00)) is transmitted to the bus, and the partner side (the target 1) receives the command.

The status phase (6) is a phase in which a status (Good 0x00) is transmitted to the bus, and the partner side (initiator 11) receives the status.

The message-in phase (7) is a phase in which an end message (Command Complete (0x00)) is transmitted, the partner side (the initiator 11) receives the end message, and the actions caused by the command are completed.

Next, the operations of the adapter 2, the low-order driver 31, the medium-order driver 32, the high-order driver 33, and the application program (the PIO process 6), which are performed when the initiator 11 issues a Read command (SCSI ID=0), are described in detail with reference to FIGS. 5 and 6. Note that S21, S22, . . . , also indicate a process order in FIG. 5.

Figure 5:
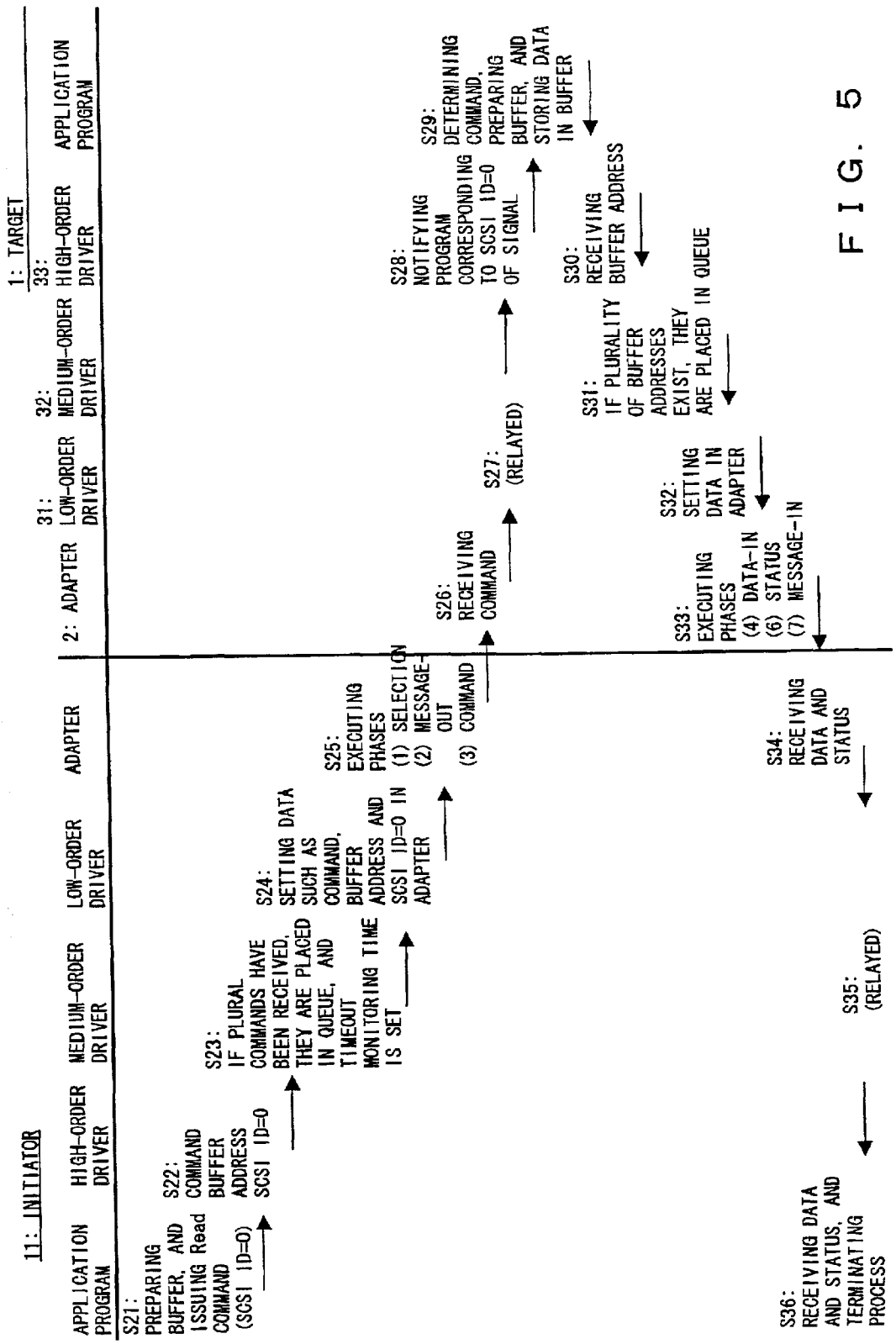
FIG. 5 explains a preferred embodiment (No. 2) according to the present invention.

FIG. 5 explains a preferred embodiment (No. 2) according to the present invention.

In this figure, in S21, the test program of the initiator 11 issues the Read command (SCSI ID=0).

In S22, the high-order driver of the initiator 11 notifies the medium-order driver of the command, a buffer address, and SCSI ID=0.

In S23, the medium-order driver of the initiator 11, if a plurality of commands are notified, places a plurality of commands in a queue, sets a timeout monitoring time to them, and notifies the low-order driver of the command, the buffer address, and SCSI ID=0.

In S24, the low-order driver of the initiator 11 sets the data (the command, the buffer address, and SCSI ID=0) in the adapter.

In S25, the adapter of the initiator 11 executes respective phases (a selection phase (1), a message-out phase (2), and a command phase (3)). As a result, phases such as a selection phase (1), a message out phase (2), and a command phase (3), which are shown in FIG. 6 and will be described later, are sequentially executed, so that the command is transmitted to the adapter 2 of the target 1 via the SCSI bus shown in FIG. 2.

In S26, the adapter 2 of the target 1 receives the command (Read command (SCSI ID=0) as a result of the phases ((1), (2), and (3)) executed in S25, and notifies the low-order driver 31 of the received command.

In S27, the low-order driver 31 notifies the medium-order driver 32 of the command, and the medium-order driver 32 notifies the high-order driver 33 of the command.

In S28, the high-order driver 33 notifies the program (the PIO process having SCSI ID=0 shown in FIG. 2) corresponding to the notified SCSI ID=0 of the command.

In S29, the application program (the PIO process shown in FIG. 2) that is notified of the command determines the command (the Read command in this case), prepares a buffer, and stores the data read from the specified address in the prepared buffer.

In S30, the high-order driver 33 receives the buffer address.

In S31, the medium-order driver 32 notifies the low-order driver 31 of the buffer address notified from the high-order driver 33. If a plurality of the data exist at this time, they are placed in a queue and sequentially notified to the low-order driver 31.

In S32, the low-order driver 31 sets the data in the adapter 2. The low-order driver 31 sets the buffer address, for example, in a corresponding register, and passes the data to the adapter 2.

In S33, the adapter 2 executes respective phases (a data-in phase (4), a status phase (6), and a message-in phase (7)). As a result, the phases such as the data-in phase (4), the status phase (6), and the message-in phase (7), which are shown in FIG. 6 and will be described later, are sequentially executed, so that the data and the status are transmitted to the adapter 2 of the initiator 11 via the SCSI bus shown in FIG. 2.

In S34, the adapter of the initiator 11 receives the data and the status as a result of the phases ((4), (6), and (7)) executed in S33.

In S35, the data and the status, which are notified from the adapter, are sequentially relayed by the low-order driver, the medium-order driver, and the high-order driver. As a result, the data and the status are notified to the application program (test program 12).

In S36, the application program receives the data and the status. Here, the actions caused by the command are completed.

As described above, if the application program (such as the test program 12) of the initiator 11 issues the Read command (SCSI ID=0), this command is notified to the application program (such as the PIO process 6), which corresponds to the I/O device specified with SCSI ID=0, via the bus, the adapter 2 of the target 1, the low-order driver 31, the medium-order driver 32, and the high-order driver 33, and data and status, which are a reply, are returned from this application program. The returned data and status are received by the application program of the initiator 11 on a route reverse to the above described one. In this way, a series of tests can be implemented.

Namely, the adapter 2, the low-order driver 31, the medium-order driver 32, and the high-order driver 33 are arranged in the target 1 to make the target 1 identical to an actual I/O device, a command is notified from the initiator 11 to the application program (such as the PIO process 6), which simulates an I/O device specified, for example, with SCSI ID=0, and the same reply (data and a status) as that of the actual I/O device in use, or an error depending on need is returned from the application program which simulates the I/O device, so that the process for a normal operation or an error of the initiator 11 is monitored. As a result, a test on the initiator can be easily conducted.

Figure 6:
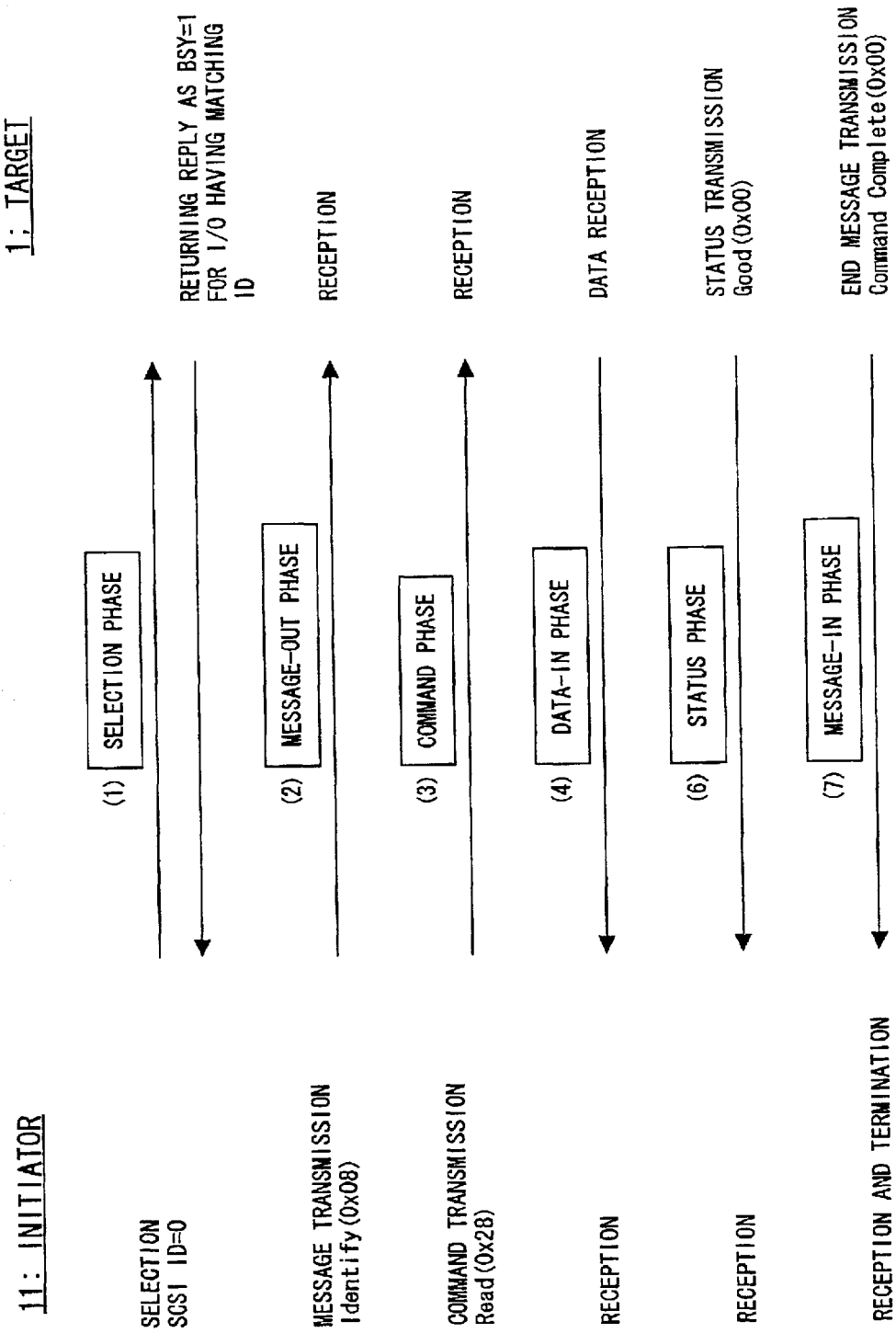
FIG. 6 exemplifies a read system command in the operations shown in FIG. 5 according to the preferred embodiment (No. 2)

FIG. 6 exemplifies a read system command in the operations shown in FIG. 5, according to the present invention. The read system command shown in FIG. 6 is transmitted as a result of the above described phases (1), (2), and (3) sequentially executed in S25 of FIG. 5, and data and a status are transmitted as a result of the phases (4), (6), and (7) executed in S33. Here, the data-in phase (4) is a phase in which data is transmitted, and the other phases (1), (2), (3), (6), and (7) are similar those explained with reference to FIG. 4.

Next, the operations of the adapter 2, the low-order driver 31, the medium-order driver 32, the high-order driver 33, and the application program (the PIO process 6), which are performed when the initiator 11 issues a Write command (SCSI ID=0), are described in detail with reference to FIGS. 7 through 9. Note that S41, S42, ..., also represent a process order in FIGS. 7 and 8.

Figure 7:
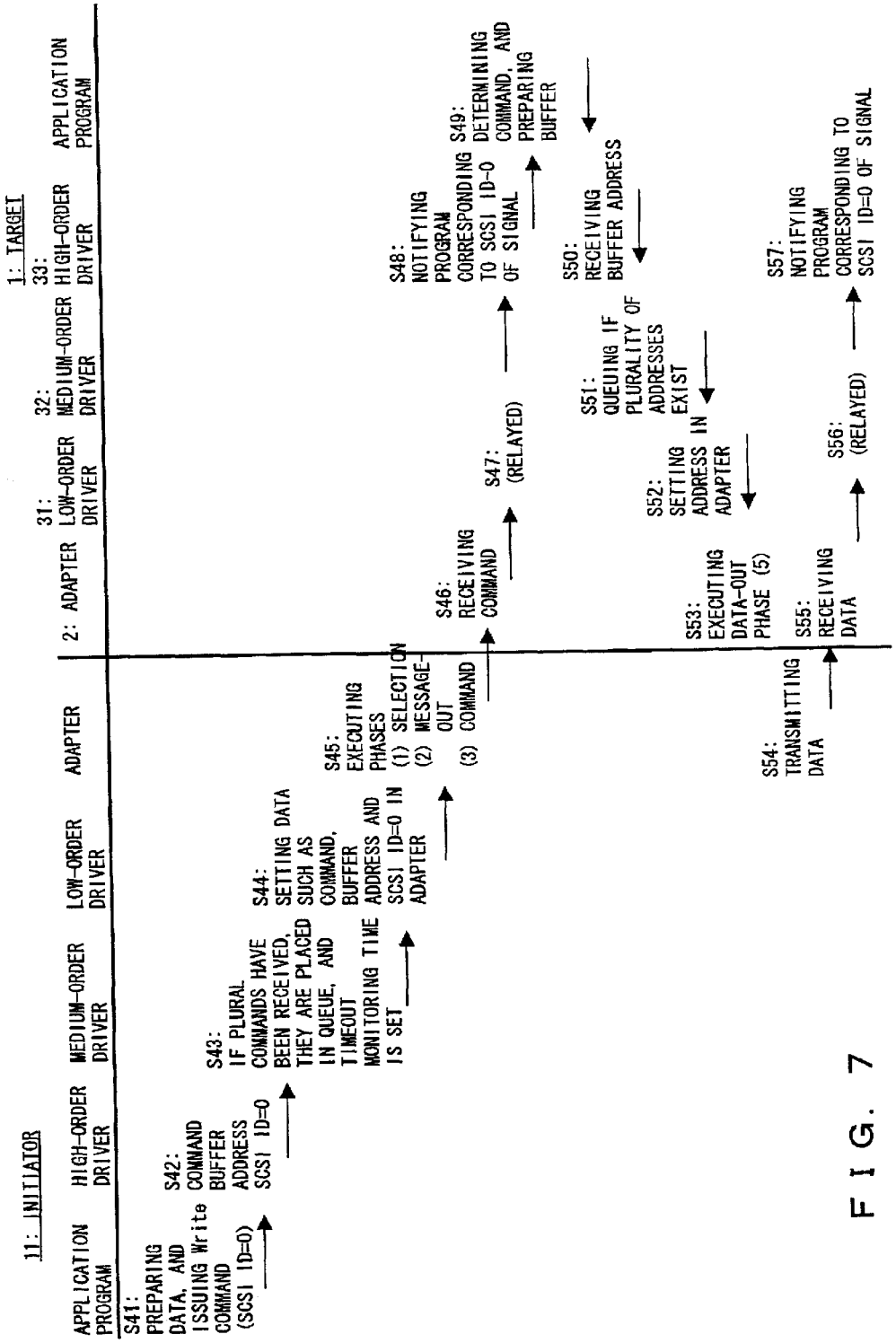
FIG. 7 explains a former stage of a preferred embodiment (No. 3) according to the present invention.
Figure 8:
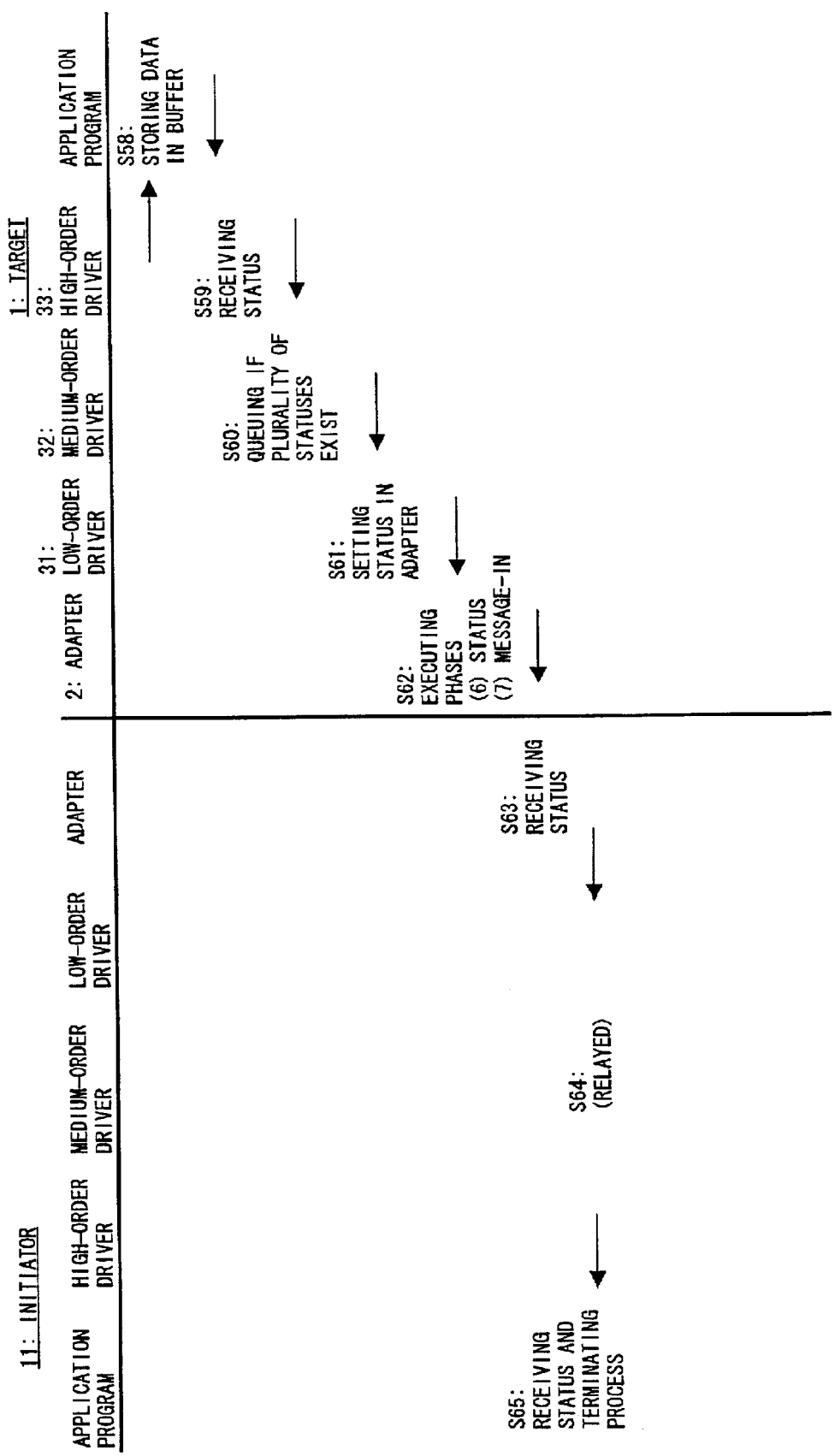
FIG. 8 explains a latter stage of the preferred embodiment (No. 3) according to the present invention.

FIGS. 7 and 8 explain a preferred embodiment (No. 3) according to the present invention. In FIG. 7, the test program of the initiator 11 prepares data, and issues the Write command (SCSI ID=0) in S41.

In S42, the high-order driver of the initiator 11 notifies the medium-order driver of the command, a buffer address, and SCSI ID=0.

In S43, the medium-order driver of the initiator 11, if a plurality of a commands exist at this time, place in a queue them, sets a timeout monitoring time to each of them, and notifies the low-order driver of the commands, the buffer addresses, and SCSI ID=0.

In S44, the low-order driver of the initiator 11 sets the data (the command, the buffer address, and SCSI ID=0) in the adapter.

In S45, the adapter of the initiator 11 executes respective phases (a selection phase (1), a message-out phase (2), and a command phase (3)). As a result, the phases such as the selection phase (1), the message-out phase (2), and the command phase (3), which are shown in FIG. 9 and will be described later, are sequentially executed, so that the command is transmitted to the adapter 2 of the target 1 via the SCSI bus shown in FIG. 2.

In S46, the adapter 2 of the target 1 receives the command (Write command (SCSI ID=0) as a result of the phases ((1), (2), and (3)) executed in S45, and notifies the low-order driver 31 of the received command.

In S47, the low-order driver 31 notifies the medium-order driver 32 of the command, and the medium-order driver 32 notifies the high-order driver 33 of the command.

In S48, the high-order driver 33 notifies the program (the PIO process 6 having SCSI ID=0 in FIG. 2) corresponding to the notified SCSI ID=0 of a signal.

In S49, the application program (the PIO process 6 shown in FIG. 2) that is notified of the signal determines the command (the Write command in this case), and prepares a buffer.

In S50, the high-order driver 33 receives a buffer address.

In S51, the medium-order driver 32 notifies the low-order driver 31 of the buffer address notified from the high-order driver 33. If a plurality of addresses exist at this time, they are placed in a queue and sequentially notified to the low-order driver 31.

In S52, the low-order driver 31 sets the buffer address in the adapter 2. The low-order driver 31 sets the buffer address, for example, in a corresponding register, and passes the buffer address at which transmitted data is to be stored to the adapter 2.

In S53, the adapter 2 executes a data-out phase (5).

In S54, the adapter of the initiator 11 transmits the data.

In S55, the data transmitted in S54 is received by the adapter 2.

In S53 to S55, the data-out phase (5) (see FIG. 9) is executed in S53, so that the write data is transmitted from the adapter of the initiator 11 to the adapter 2 of the target 1 here, and the adapter 2 receives the write data, and stores the data in the buffer.

In S56, the low-order driver 31 notifies the medium-order driver 32 of the buffer address at which the data is stored, and the medium-order driver 32 then notifies the high-order driver 33 of the buffer address, etc.

In S57, the high-order driver 33 notifies the program (the PIO process 6 having SCSI ID=0 shown in FIG. 2) corresponding to SCSI=0, since it is notified of the buffer address.

In S58 of FIG. 8, the application program (the PIO process 6 shown in FIG. 2) that is notified of the signal extracts the data, and stores the extracted data in the buffer.

In S59, the high-order driver 33 receives a status.

In S60, the medium-order driver 32 receives the status from the high-order driver 33, and notifies the low-order driver 31 of the status. If a plurality of statuses exist at this time, they are placed in a queue and sequentially notified to the low-order driver 31.

In S61, the low-order driver 31 sets the status in the adapter 2. The low-order driver 31 sets the status signal, for example, in a corresponding register, and notifies the adapter 2 of the status signal.

In S62, the adapter 2 executes respective phases (a status phase (6), and a message-in phase (7)). As a result, the phases such as the status phase (6) and the message-in phase (7), which are shown in FIG. 9 and will be described later, are sequentially executed, so that the status signal is transmitted to the adapter 2 of the initiator 11 via the SCSI bus shown in FIG. 2.

In S63, the adapter of the initiator 11 receives the status signal as a result of the phases (6) and (7) executed in S62.

In S64, the status signal notified from the adapter is sequentially relayed by the low-order driver, the medium-order driver, and the high-order driver, and notified to the application program (the test program 12).

In S65, the application program receives the status signal, and the process is completed.

As described above, if the application program (such as the test program 12) of the initiator 11 issues the Write command (SCSI ID=0), this command is notified to the application program (such as the PIO process 6), which corresponds to the I/O device specified with SCSI ID=0, via the bus, the adapter 2 of the target 1, the low-order driver 31, the medium-order driver 32, and the high-order driver 33. Then, a status corresponding to this command is returned from the application program, and received by the applica-tion program of the initiator 11 on a reverse route. In this way, a series of tests can be implemented.

Namely, the adapter 2, the low-order driver 31, the medium-order driver 32, and the high-order driver 33 are arranged in the target 1 to make the target 1 identical to an actual I/O device, a command is notified from the initiator 11 to the application program (such as the PIO process 6), which simulates the I/O device specified, for example, with SCSI ID=0, and the same status of the write process as that of the actual I/O device in use, or an error depending on need is returned from the application program, so that the process performed when the initiator 11 properly operates or when an error occurs is monitored. As a result, a test on the initiator can be easily conducted.

Figure 9:
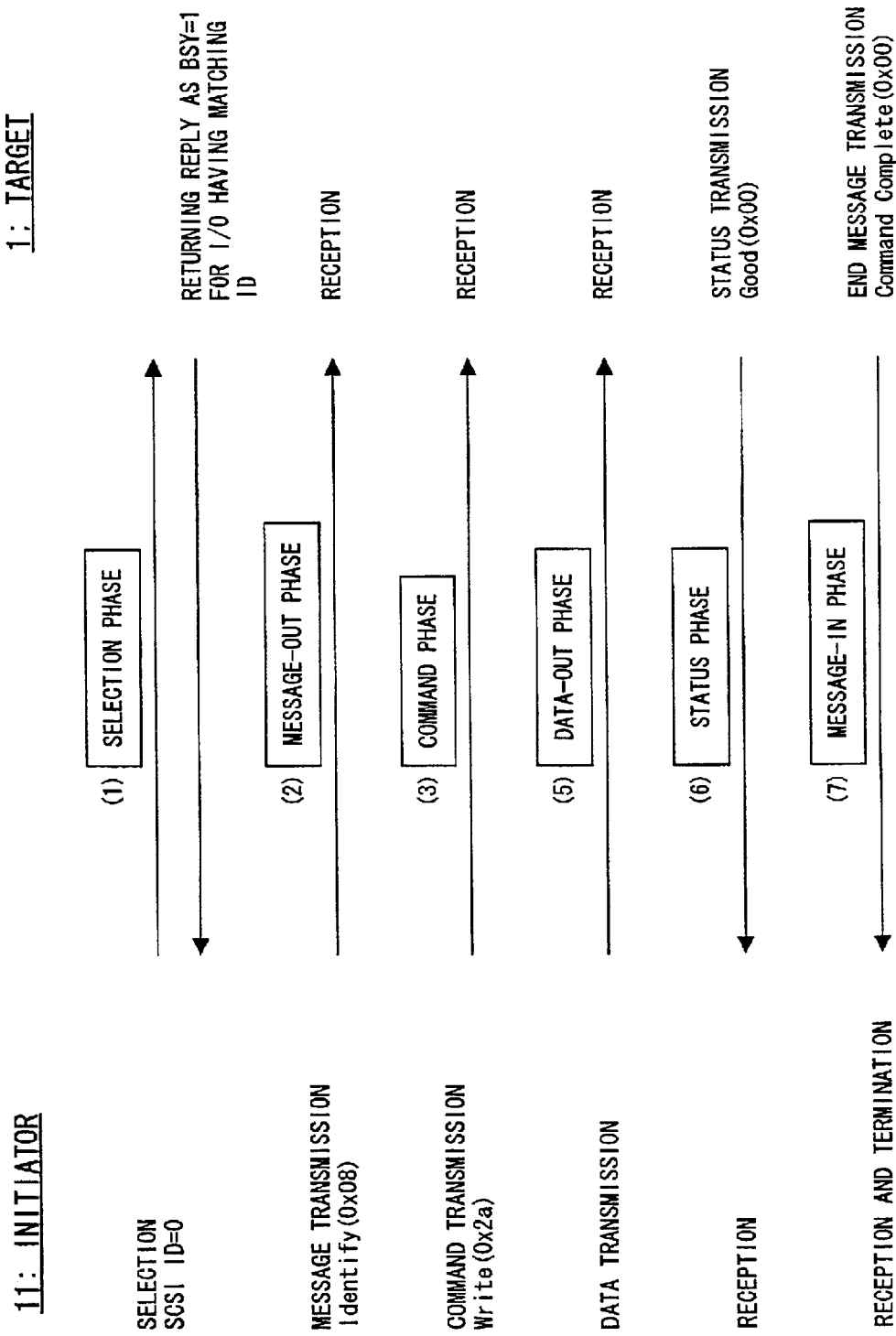
FIG. 9 exemplifies a write system command in the operations shown in FIGS. 7 and 8 according to the preferred embodiment (No. 3)

FIG. 9 exemplifies a write system command in the operations shown in FIGS. 7 and 8, according to the present invention. The write system command shown in FIG. 9 is transmitted as a result of the phases (1), (2), and (3) sequentially executed in the above described S45 of FIG. 7, data is transmitted as a result of the phase (5) executed in S53 of FIG. 7, and a status is transmitted as a result of the phases (6) and (7) executed in S62 of FIG. 8.

In FIG. 9, the data-out phase (5) is a phase in which data of the Write command is transmitted. The other phases (1), (2), (3), (6), and (7) are similar to those explained with reference to FIG. 4.

As described above, the device driver apparatus according to the present invention passes data between the initiator 11 and a simulation application of the target 1. This data passing is not limited to an implementation via a SCSI bus. Command or data passing can be made also with a protocol using other standards by means of encapsulation.

FIG. 10 explains encapsulation in the present invention. FIG. 10A exemplifies encapsulation using an FC protocol, whereas FIG. 10B exemplifies encapsulation using an iSCSI protocol. FIGS. 10A and 10B schematically show the encapsulation by taking as an example the above described or known read system command using a SCSI protocol. Namely, command information such as

SCSI ID

Read (Read command)

Address (address of read data)

Length (length of read data)

Others are set in a frame (Frame Format) using the FC protocol as illustrated in FIG. 10A, or in the session layer of the iSCSI protocol as illustrated in FIG. 10B, so that encapsulation can be made.

Such encapsulated SCSI information is transmitted, for example as an optical ON/OFF signal over an optical fiber, whereby it becomes possible to transmit/receive a command and a piece of data as SCSI information encapsulated in a data protocol that is not the SCSI protocol to/from another device at a remote site.

Figure 11:
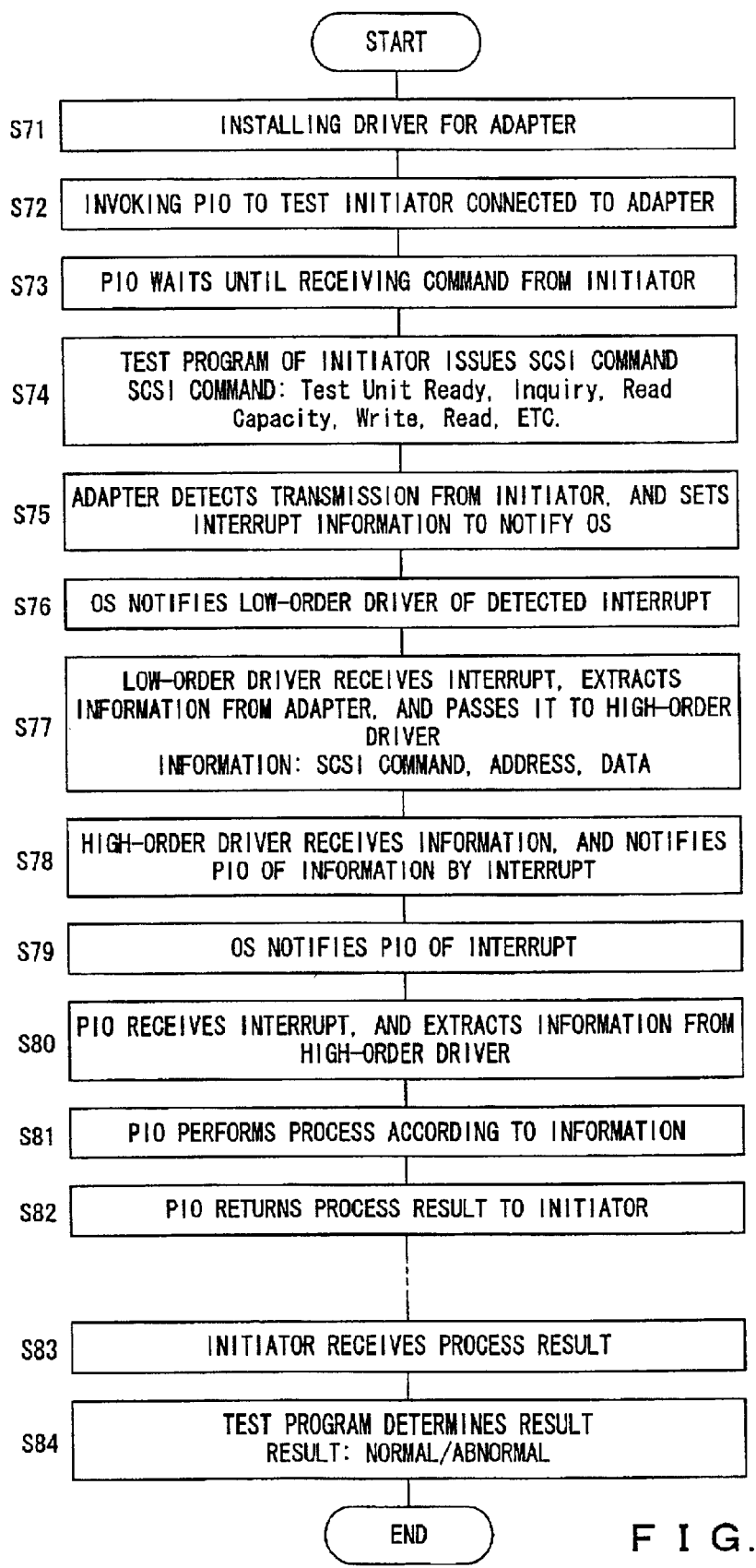
FIG. 11 is a flowchart explaining the operations for testing an initiator, according to the present invention.

FIG. 11 is a flowchart explaining the operations for conducting a test on an initiator, according to the present invention. This is a flowchart when the target 1 is connected to the initiator 11 shown in FIG. 2 via the bus or a network not shown, and operated as a pseudo I/O device, and a test is conducted on the initiator 11.

In FIG. 11, a driver for the adapter 2 is installed in step S71. This is an operation for installing the above described driver 3 (the low-order driver 31, the medium-order driver 32, and the high-order driver 33) for the adapter 2 of the target 1 shown in FIG. 2.

In step S72, PIO (the PIO process shown in FIG. 2) is invoked to conduct a test on the initiator 11 connected to the adapter 2.

In step S73, the PIO (the PIO process 6 shown in FIG. 2) waits until receiving a command from the initiator 11.

In step S74, the test program 12 of the initiator 11 issues a SCSI command. For example, any of the following commands is issued.

Test Unit Ready

Inquiry

Read capacity

Write

Read

In step S75, the adapter 2 sets interrupt information for notifying an OS upon detection of the transmission from the initiator 11.

In step S76, the OS notifies the low-order driver 31 of the detected interrupt.

In step S77, the low-order driver 31 receives the interrupt, extracts information from the adapter 2, and passes the information to the high-order driver 33 via the medium-order driver 32. The passed information is information required among the SCSI command, an address, data, etc.

In step S78, the high-order driver 33 receives the information, and notifies the PIO (the PIO process 6) of the information as an interrupt.

In step S79, the OS notifies the PIO (the PIO process 6) of the interrupt.

In step S80, the PIO receives the interrupt, and extracts the information from the high-order driver 33.

In step S81, the PIO performs a process according to the information.

In step S82, the PIO returns a process result to the initiator 11 on a reverse route.

In step S83, the initiator 11 receives the process result.

In step S84, the test program 12 determines the result. Namely, the test program 12 determines whether the operation of the initiator 11 is either normal or abnormal by checking whether the process corresponding to the process result, which is received by the initiator 11 in step S83, is either terminated if the process result is a normal result, or retried by reissuing the (Read) command as a retry process if the process result is a read error.

To make an error occur, the test program 12 transmits setting files in which the contents of an error occurrence are set to the PIO (the PIO process 6) via the bus or the network not shown prior to a test, and makes the PIO store the file. Then, the PIO makes the error automatically occur according to the setting files.

Figure 12:
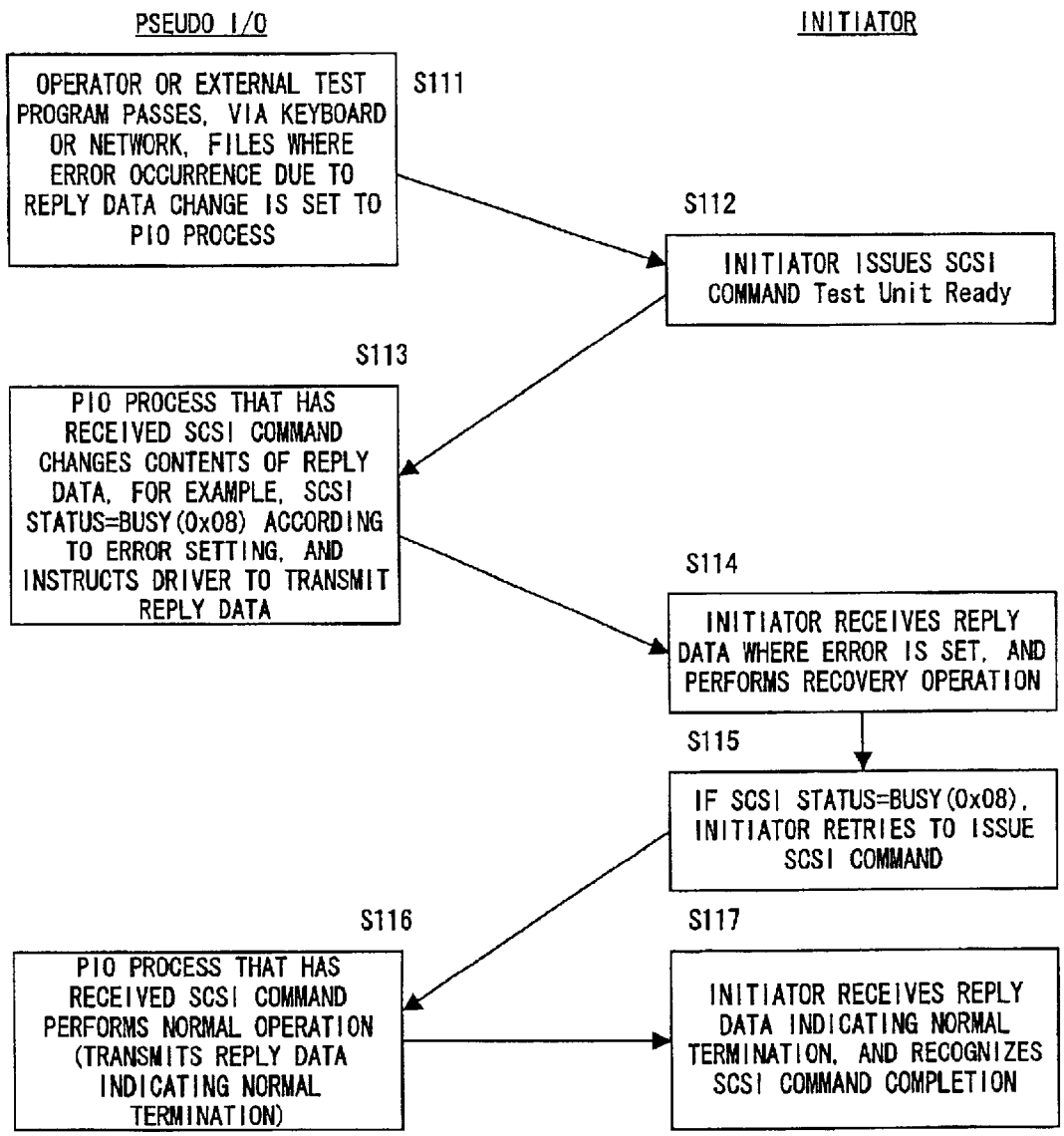
FIG. 12 is a flowchart exemplifying the operations for making an error occur by changing SCSI protocol data, according to the present invention.

FIG. 12 is a flowchart explaining the operations (for generating an error by changing SCSI protocol data), according to the present invention.

Here, a pseudo I/O on the left side represents that the target (the pseudo I/O device) 1 shown in FIG. 2 performs the operations in below stages, whereas an initiator on the right side represents that the initiator 11 shown in FIG. 2 performs the operations in below stages. A pseudo I/O and an initiator in the subsequent drawings are similar.

In FIG. 12, an operator or an external test program passes, via a keyboard or a network, files in which an error occurrence due to a change in reply data is set to the PIO process 6.

Namely, the operator operates the keyboard not shown of the target (pseudo I/O device) 1 shown in FIG. 2 to set, as the setting files of the PIO process 6, the file in which the contents of an error of an I/O device are set. Or, this file is set as the setting file of the PIO process 6 from the initiator 11 via a network. The setting files are set, for example, as shown in FIGS. 13A and 13B to be described later.

In step S112, the initiator 11 issues a SCSI command Test Unit Ready (see FIG. 13C).

In step S113, the PIO process 6 that has received the SCSI command changes the contents of reply data (for example, to SCSI STATUS=BUSY (0x08)) according to the error setting, and instructs the driver 3 to return the reply data.

With this operation, the PIO process 6 instructs the driver 3 to return the reply data the contents of which are changed, for example, SCSI status that should originally be GOOD (0x00) is changed to BUSY (0x08) according to the error contents set in the setting files (see FIGS. 13A and 13B) in step S111 for the SCSI command that the PIO process 6 has received via the bus or a network.

Note that after the PIO process 6 repeats the error process once or a specified number of times (once in this example), it deletes or restores the error information to the normal state so that a normal reply is made in the next operation in step S113.

In step S114, the initiator 11 receives the reply data transmitted in step S113, and performs a recovery operation if the received data is reply data where an error is set as in this example.

In step S115, if SCSI STATUS=BUSY (0x08) as a result of the recovery operation performed in step S114, a retry operation is performed (the SCSI command is reissued).

In step S116, the PIO process 6 that has received the SCSI command reissued in step S115 performs a normal operation (returns reply data indicating a normal termination).

In step S117, the initiator 11 receives the reply data indicating the normal termination, and verifies the completion of the SCSI command.

As described above, after the contents of an error for making an error occur by changing reply data is set in the setting files of the PIO process 6 of the target (pseudo I/O device) 1, the initiator 11 issues a command to make the PIO process 6 return reply data where the error is set, and reissues the command as a recovery process corresponding to the error reply, and the PIO process 6 returns normal reply data, so that the initiator 11 is normally terminated. As a result, the test program 12 within the initiator 11 can conduct a test of determining whether or not the initiator 11 has properly performed the recovery operation for the error.

FIGS. 13A through 13D exemplify the setting files relating to the operations shown in FIG. 12. FIG. 13A exemplifies a process setting file. This figure exemplifies the contents of the process setting file of the PIO process 6, which are set in step S111 of FIG. 12. The following items of information are set as shown in FIG. 13A.

command: Test Unit Ready valid/invalid: valid action: control system error file name: error_file1

FIG. 13B exemplifies an error setting file (error_file1). This file includes the contents of an error set in the error file having the name (error_file1), which is set in the process setting file shown in FIG. 13A. In this example, the following items of information are set as shown in FIG. 13B.

timing: when reply data is returned error contents: reply data change (for example, from GOOD (0x00) to BUSY (0x08)

The above described two setting files (shown in FIGS. 13A and 13B) are used to set the contents of an error, so that the PIO process 6 can make the error occur according to the contents of the error set in the setting files (at the set error timing). Note that the contents of the error are deleted (or set to be invalidated) after the error occurs once or a specified number of times, and a normal reply is returned at the next time.

FIG. 13C exemplifies an initiator SCSI command. This figure exemplifies the SCSI command that the initiator 11 issues in step S112 of FIG. 12. The following items of information are set as shown in FIG. 13C.

command: Test Unit Ready
   contents: 00 00 00 00 00 00

FIG. 13D exemplifies STATUS. This indicates information when an error reply is returned in step S113 of FIG. 12. The following items of information are set as shown in FIG. 13D.

status: GOOD or BUSY
   value: 0 or 8

FIG. 14 is a flowchart showing the operations (for making an error occur by invoking a hardware error generation capability comprised by the adapter), according to the present invention.

In FIG. 14, an operator or an external test program passes, via a keyboard or a network, a file in which hardware error generation is set to the PIO process 6. As a result, setting files that are shown in FIGS. 15A and 15B and will be described later are set as the setting files of the PIO process 6.

In step S142, the initiator issues the SCSI command Test Unit Ready.

In step S143, the PIO process that has received the SCSI command instructs the driver to make an error occur at the timing of making an error occur.

In step S144, the driver accesses the register of the adapter for making a hardware error occur, and makes the error occur.

In step S145, the initiator detects the error, and performs a recovery operation.

As described above, after the contents of an error (hardware error generation) are set in the setting files of the PIO process 6 of the target (pseudo I/O device) 1, the initiator 11 issues a command, the hardware error is made to occur at the set timing, and this hardware error is detected by the initiator 11, so that the initiator performs a recovery operation. Consequently, the test program 12 within the initiator 11 can conduct a test of determining whether or not the initiator 11 detects the hardware error occurrence, and performs a recovery operation, when the hardware error occurs in the target (pseudo I/O device) 1.

FIGS. 15A through 15E are schematics relating to the operations performed in FIG. 14.

FIG. 15A exemplifies a process setting file. This file exemplifies the contents of the setting file of the PIO process 6, which are set in step S141 of FIG. 14. The following items of information are set as shown in FIG. 15A.

command: Test Unit Ready
   valid/invalid: valid
   operation: control system
   error file name: error_file10

FIG. 15B exemplifies the error setting file (error_file10). As shown in this figure, the following items of information are set as the contents of an error set in the error file having the name "error_file10" specified in the process setting file shown in FIG. 15A.

timing: when reply data is returned
   error contents: generating a fault in a signal transmitted over a cable (generating, for example, a link failure)

The above described two setting files (shown in FIGS. 15A and 15B) are used to set the contents of an error, so that the error (a hardware error, for a example, by a change in reply data such as "link failure") in accordance with the contents set in the setting files is made to occur at the timing of making an error occur in response to a command issued from the initiator 11. As a result, the initiator 11 detects the hardware error, and a test of determining whether or not the initiator 11 performs a recovery process can be conducted based on this detection.

FIG. 15C exemplifies the initiator SCSI command. This exemplifies the SCSI command that the initiator 11 issues in step S142 of FIG. 14. The following items of information are set as shown in FIG. 15C.

command: Test Unit Ready
   contents: 00 00 00 00 00 00

FIG. 15D exemplifies STATUS. This exemplifies the reply data that is transmitted, for example, from the target (pseudo I/O device) 1 in step S144 of FIG. 14.

FIG. 15E exemplifies an error occurrence caused by a register access.

(e-1) of FIG. 15E shows the state where a bit for making a link failure occur in the register of the adapter 2 is set to 0 (indicating non-generation of an error). This is the state where a hardware error "Link Failure" is not made to occur in the adapter 2 shown in FIG. 2, and a link problem occurs in the bus shown in FIG. 2.

(e-2 of FIG. 15E shows the state where the bit for making a link failure occur in the register of the adapter 2 is set to 1 (indicating generation of an error) This is the state where the hardware error "Link Failure" is made to occur in the adapter 2 shown in FIG. 2, and a link problem occurs in the bus shown in FIG. 2. In this way, the hardware error occurrence in step S144 of FIG. 14 can be implemented.

What is claimed is:

1. A device driver apparatus connected to an initiator via a bus, transmitting and receiving signals to and from a process simulating an I/O device, comprising:
   an adapter, connected to the bus, transmitting to and receiving from the initiator at least one of a command and a set of data using a predetermined protocol; and
   a driver, arranged between said adapter and a pseudo I/O process simulating the I/O device, notifying the pseudo I/O process of at least one of the command and the set of data transmitted from said adapter, notifying said adapter of at least one of status and another set of data notified from the pseudo I/O process, and performing a queuing process when receiving commands from the pseudo I/O process, said adapter notifying said driver of the command upon receipt of the command from the initiator, said driver notifying the pseudo I/O process of the command after receipt of notification, the pseudo I/O process returning an exchange status to said driver, said driver notifying said adapter of the status, and said adapter returning the status to the initiator.

2. A device driver apparatus connected to an initiator via a bus, transmitting and receiving signals to and from a process simulating an I/O device, comprising:
   an adapter, connected to the bus, transmitting to and receiving from the initiator at least one of a command and a set of data using a predetermined protocol; and
   a driver, arranged between said adapter and a pseudo 110 process simulating the I/O device, notifying the pseudo I/O process of at least one of the command and the set of data transmitted from said adapter, notifying said adapter of at least one of status and another set of data notified from the pseudo I/O process, and performing a queuing process when receiving commands from the pseudo I/O process, said adapter notifying said driver of the command upon receipt of the command from the initiator, said driver notifying the pseudo I/O process of the notified command, the pseudo I/O process preparing a set of data, storing the set of the data at the buffer address in a buffer, and returning the buffer address to said driver, said driver storing the buffer address in a register of said adapter, and said adapter extracting the set of the data from the buffer address in the register, and transmitting the set of the data to the initiator.

3. A device driver apparatus connected to an initiator via a bus, transmitting and receiving signals to and from a process simulating an I/O device, comprising:

an adapter, connected to the bus, transmitting to and receiving from the initiator at least one of a command and a set of data using a predetermined protocol; and a driver, arranged between said adapter and a pseudo I/O process simulating the I/O device, notifying the pseudo I/O process of at least one of the command and the set of data transmitted from said adapter, notifying said adapter of at least one of status and another set of data notified from the pseudo I/O process, and performing a queuing process when receiving commands from the pseudo I/O process, said adapter notifying said driver of the command upon receipt of the command from the initiator, said driver notifying the pseudo I/O process of the command, the pseudo I/O process preparing a buffer, and returning a buffer address to said driver, said driver storing the buffer address in a register of said adapter, said adapter storing a set of data that is received from the initiator by issuing a data request using the buffer address in the register, and notifying said driver that the set of data has been stored, said driver asynchronously notifying the pseudo I/O process that the data has been received, the pseudo I/O process extracting the data from the buffer, and returning a response status to said driver, said driver storing the status in a register of said adapter, and said adapter returning the status to the initiator.

4. The device driver apparatus according to claim 3, wherein the pseudo I/O process simulates a specified actual I/O device by transmitting/receiving the status or the data of the specified I/O device.

5. The device driver apparatus according to claim 3, wherein the pseudo I/O process simulates an error test of a specified actual I/O device by making an error, which is exclusively associated with an encapsulation protocol consisting of a protocol that encapsulates SCSI information but not consisting of a SCSI protocol, and is specified when transmitting/receiving the status or data of the specified I/O device occurs.

6. A device driver apparatus connected to an initiator via a bus, transmitting and receiving signals to and from a process simulating an I/O device, comprising:

an adapter, connected to the bus, transmitting to and receiving from the initiator at least one of a command and a set of data using a predetermined protocol; and a driver configured as a low-order driver for said adapter, a high-order driver for a pseudo I/O process simulating the I/O device, and a medium-order driver transmitting/receiving the signals between the low-order driver and the high-order driver, notifying the pseudo I/O process of the at least one of the command and the set of data transmitted from said adapter, notifying said adapter of at least one of status and another set of data notified from the pseudo I/O process, and performing a queuing process when receiving multiple commands from the pseudo I/O process.

7. The device driver apparatus according to claim 6, wherein the predetermined protocol is a SCSI protocol or an encapsulation protocol consisting of a protocol that encapsulates SCSI information but not consisting of the SCSI protocol.

8. A device driver apparatus connected to an initiator via a bus, transmitting and receiving signals to and from a process simulating an I/O device, comprising:

an adapter, connected to the bus, transmitting to and receiving from the initiator at least one of a command and a set of data using a predetermined protocol; and a driver, arranged between said adapter and a pseudo I/O process simulating the I/O device, notifying the pseudo I/O process of at least one of the command and the set of data transmitted from said adapter, notifying said adapter of at least one of status and another set of data notified from the pseudo I/O process, and performing a queuing process when receiving commands from the pseudo I/O process, the pseudo I/O process notifying at least one of said adapter and said driver of an error exclusively associated with an encapsulation protocol consisting of a protocol that encapsulates SCSI information but not consisting of a SCSI protocol, and the at least one of said adapter and said driver makes the error occur.

* * * * *

UNITED STATES PATENT AND TRADEMARK OFFICE
CERTIFICATE OF CORRECTION

PATENT NO. : 6,892,254 B2  
DATED : May 10, 2005  
INVENTOR(S) : Masakazu Suzuki et al.

It is certified that error appears in the above-identified patent and that said Letters Patent is hereby corrected as shown below:

Column 14,
Line 63, delete "110" and insert -- I/O --.

Signed and Sealed this

Seventeenth Day of January, 2006

JON W. DUDAS
*Director of the United States Patent and Trademark Office*